US010372708B1

(12) United States Patent
Kim

(10) Patent No.: US 10,372,708 B1
(45) Date of Patent: Aug. 6, 2019

(54) STATISTIC NORMALIZATION IN A DATA STORE SYSTEM

(71) Applicant: Teradata US, Inc., Dayton, OH (US)

(72) Inventor: Sung Jin Kim, Buena Park, CA (US)

(73) Assignee: Teradata US, Inc., San Diego, CA (US)

( * ) Notice: Subject to any disclaimer, the term of this patent is extended or adjusted under 35 U.S.C. 154(b) by 298 days.

(21) Appl. No.: 14/588,126

(22) Filed: Dec. 31, 2014

(51) Int. Cl.
*G06F 16/00* (2019.01)
*G06F 16/2453* (2019.01)
*G06F 16/23* (2019.01)

(52) U.S. Cl.
CPC .... *G06F 16/24545* (2019.01); *G06F 16/2365* (2019.01)

(58) Field of Classification Search
CPC ............... G06F 17/30607; G06Q 40/02; Y10S 707/99934
USPC ......................................... 707/694, 718, 803
See application file for complete search history.

(56) References Cited

U.S. PATENT DOCUMENTS

| | | | | |
|---|---|---|---|---|
| 6,460,045 B1 * | 10/2002 | Aboulnaga | ....... | G06F 17/30469 |
| 6,542,905 B1 * | 4/2003 | Fogel | .................... | G06Q 10/06 |
| 7,263,474 B2 * | 8/2007 | Fables | .................... | G06N 3/004 463/32 |
| 7,610,588 B1 * | 10/2009 | Hager | ................. | H04L 41/0213 709/202 |
| 7,809,768 B2 * | 10/2010 | Owens | .............. | G06F 17/30607 707/803 |
| 7,933,932 B2 * | 4/2011 | Singh | .................... | G06F 16/217 707/803 |
| 8,266,120 B2 * | 9/2012 | Hsu | .................... | G06F 17/30017 707/694 |
| 8,504,562 B1 * | 8/2013 | Ikeda | ................. | G06F 17/30672 707/723 |
| 9,798,629 B1 * | 10/2017 | Shilane | .............. | G06F 16/2365 |
| 2004/0075685 A1 * | 4/2004 | Ohyama | ................ | G06Q 10/06 715/745 |
| 2005/0021287 A1 * | 1/2005 | Rjaibi | .............. | G06F 17/30595 702/180 |
| 2005/0050041 A1 * | 3/2005 | Galindo-Legaria | ......................... | G06F 17/30536 |
| 2005/0149505 A1 * | 7/2005 | Bossman | .......... | G06F 17/30536 |
| 2005/0223089 A1 * | 10/2005 | Rhodes | ............... | H04L 43/0876 709/223 |
| 2006/0106832 A1 * | 5/2006 | Ben-Dyke | ......... | G06F 17/30327 |

(Continued)

*Primary Examiner* — Hanh B Thai
(74) *Attorney, Agent, or Firm* — Randy L. Campbell, Jr.

(57) ABSTRACT

A data store system may include an array of persistent storage devices configured to store a plurality of data store tables and a set of rules associated with a plurality of statistics. Each rule may include a relationship between at least two statistics. The data store system may further include a processor in communication with the storage device. The processor may generate the plurality of statistics on a data store table and retrieve the set of rules. The processor may evaluate the set of rules based on the plurality of statistics and, in response to the determination that at least one rule of the set of rules is violated, adjust a value of at least one of the statistics. The processor may store values of the plurality of statistics in at least one of the persistent storage devices, receive a query on the data store table, and use the stored statistics to generate a response to the query. A method and computer-readable medium are also disclosed.

20 Claims, 5 Drawing Sheets

(56) References Cited

U.S. PATENT DOCUMENTS

| | | | |
|---|---|---|---|
| 2006/0239562 A1* | 10/2006 | Bhattacharyay | G06K 9/00402 382/188 |
| 2007/0180490 A1* | 8/2007 | Renzi | G06F 21/577 726/1 |
| 2007/0233634 A1* | 10/2007 | Corvinelli | G06F 16/24545 |
| 2008/0114801 A1* | 5/2008 | Singh | G06F 17/30306 |
| 2008/0133454 A1* | 6/2008 | Markl | G06F 17/30457 |
| 2008/0275840 A1* | 11/2008 | Burger | G06F 17/30398 |
| 2008/0301085 A1* | 12/2008 | Faunce | G06F 17/30466 |
| 2009/0003215 A1* | 1/2009 | Wang | H04L 47/10 370/236.1 |
| 2009/0132230 A1* | 5/2009 | Kanevsky | G06F 17/289 704/2 |
| 2009/0216709 A1* | 8/2009 | Cheng | G06F 17/30442 |
| 2010/0030491 A1* | 2/2010 | Ziegel | F17D 5/00 702/34 |
| 2010/0281004 A1* | 11/2010 | Kapoor | G06F 17/30501 707/693 |
| 2010/0287016 A1* | 11/2010 | Isozaki | G06Q 10/0633 705/7.27 |
| 2010/0306249 A1* | 12/2010 | Hill | G06F 17/30867 707/769 |
| 2010/0328100 A1* | 12/2010 | Fujiwara | G08G 1/0104 340/905 |
| 2010/0332684 A1* | 12/2010 | Selitser | G06F 8/60 709/250 |
| 2011/0196857 A1* | 8/2011 | Chen | G06F 16/24539 707/714 |
| 2012/0036111 A1* | 2/2012 | Basu | G06F 16/2462 707/687 |
| 2013/0198165 A1* | 8/2013 | Cheng | G06F 17/30289 707/714 |
| 2014/0215618 A1* | 7/2014 | Striem Amit | G06F 21/55 726/23 |
| 2014/0304109 A1* | 10/2014 | von Neuforn | G06Q 30/0633 705/26.8 |
| 2015/0149441 A1* | 5/2015 | Nica | G06F 17/30463 707/719 |
| 2015/0154255 A1* | 6/2015 | Cole | G06F 17/30463 707/718 |
| 2015/0324432 A1* | 11/2015 | Gangloor | G06F 17/30463 707/718 |
| 2016/0054933 A1* | 2/2016 | Haghighi | G06F 3/0611 711/103 |

* cited by examiner

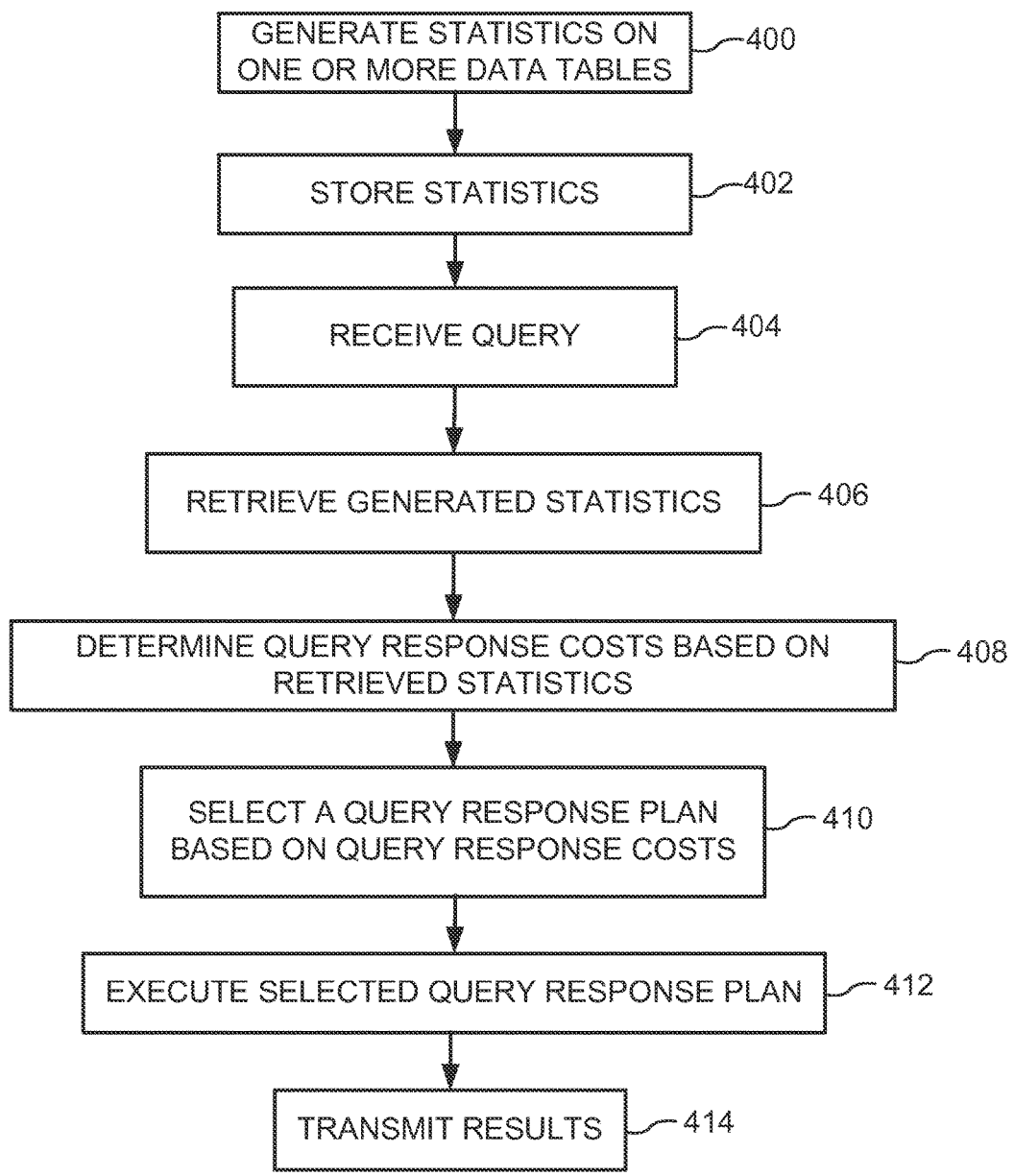

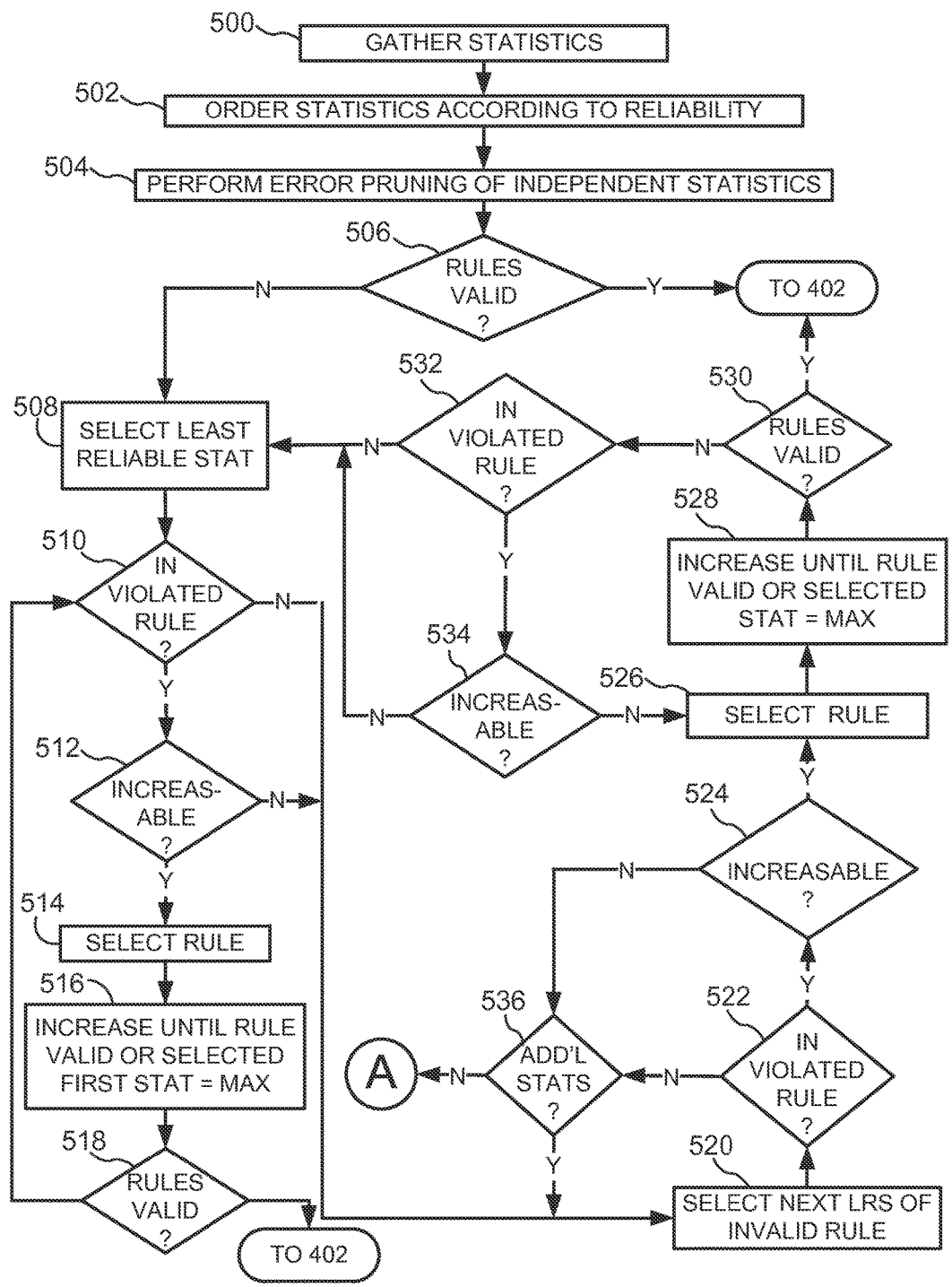

(12) United States Patent
US 10,372,708 B1

STATISTIC NORMALIZATION IN A DATA STORE SYSTEM

BACKGROUND

1. Technical Field

The present disclosure relates generally to data store statistics, and more particularly to, normalization of data store statistics.

2. Related Art

Data stores systems, such as database and file systems, store vast amounts of logically related data in the form of data tables. Queries may be used to perform various analytics on the data tables to generate desired results. Query response plans may exploit statistics on columns of a data table in order to find optimal query response plans for the queries that refer to the columns. Since it is expensive in terms of resources to collect statistics, the collection is typically performed infrequently. The collected statistics become stale as the underlying data of the data tables gets changed or new data comes in. Query response planning estimates up-to-date statistics and uses the estimated statistics for the query planning. Each statistic may have an individual integrity, such as an absolute minimum and/or maximum. These individual integrities may be used as guidelines to adjust the statistics to within acceptable ranges. When up-to-date statistics are estimated, the integrity of relationships among statistics could be compromised. One example is that the sum of "the number of unique values" and "the high mode frequency" should not exceed the number of rows in a table. The broken integrity may cause non-optimal query response plans to be generated. Thus, it would be beneficial to maintain the relationship integrity between statistics.

SUMMARY

In one aspect of the present disclosure, a data store system may include an array of persistent storage devices configured to store a plurality of data store tables and a set of rules associated with a plurality of statistics. Each rule may include a relationship between at least two statistics. The data store system may further include a processor in communication with the storage device. The processor may generate the plurality of statistics on a data store table from the plurality of data store tables. The processor may retrieve the set of rules. The processor may evaluate the set of rules based on the plurality of statistics. The processor may, in response to the determination that at least one rule of the set of rules is violated, adjust a value of at least one of the statistics. The processor may store values of the plurality of statistics in at least one of the persistent storage devices. The processor may receive a query on the data store table. The processor may use the stored statistics to generate a response to the query.

According to another aspect of the disclosure, a computer-implemented method may include generating a plurality of statistics on a data store table from a plurality of data store tables stored in an array of persistent storage devices. The method may further include retrieving a set of rules associated with the plurality of statistics. Each rule may include a relationship between at least two statistics. The method may further include evaluating the set of rules based on the plurality of statistics. The method may further include, in response to the determination that at least one rule of the set of rules is violated, adjusting a value of at least one of the statistics. The method may further include storing values of the plurality of statistics in at least one of the persistent storage devices. The method may further include receiving a query on the data store table. The method may further include using the stored statistics to generate a response to the query.

A non-transitory computer-readable medium may be encoded with a plurality of instructions executed by a processor. The plurality of instructions may include instructions to generate a plurality of statistics on a data store table from a plurality of data store tables stored in an array of persistent storage devices. The plurality of instructions may further include instructions to retrieve a set of rules associated with the plurality of statistics. Each rule comprises a relationship between at least two statistics. The plurality of instructions may further include instructions to evaluate the set of rules based on the plurality of statistics. The plurality of instructions may further include, in response to the determination that at least one rule of the set of rules is violated, instructions to adjust a value of at least one of the statistics. The plurality of instructions may further include instructions to store values of the plurality of statistics in at least one of the persistent storage devices. The plurality of instructions may further include instructions to receive a query on the data store table. The plurality of instructions may further include instructions to use the stored statistics to generate a response to the query.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is an operational flow diagram of example operation of a database system.

FIGS. 5A and 5B are an operational flow diagram of example operation of a database system during statistic normalization.

DETAILED DESCRIPTION OF THE FIGURES

Figure 1:
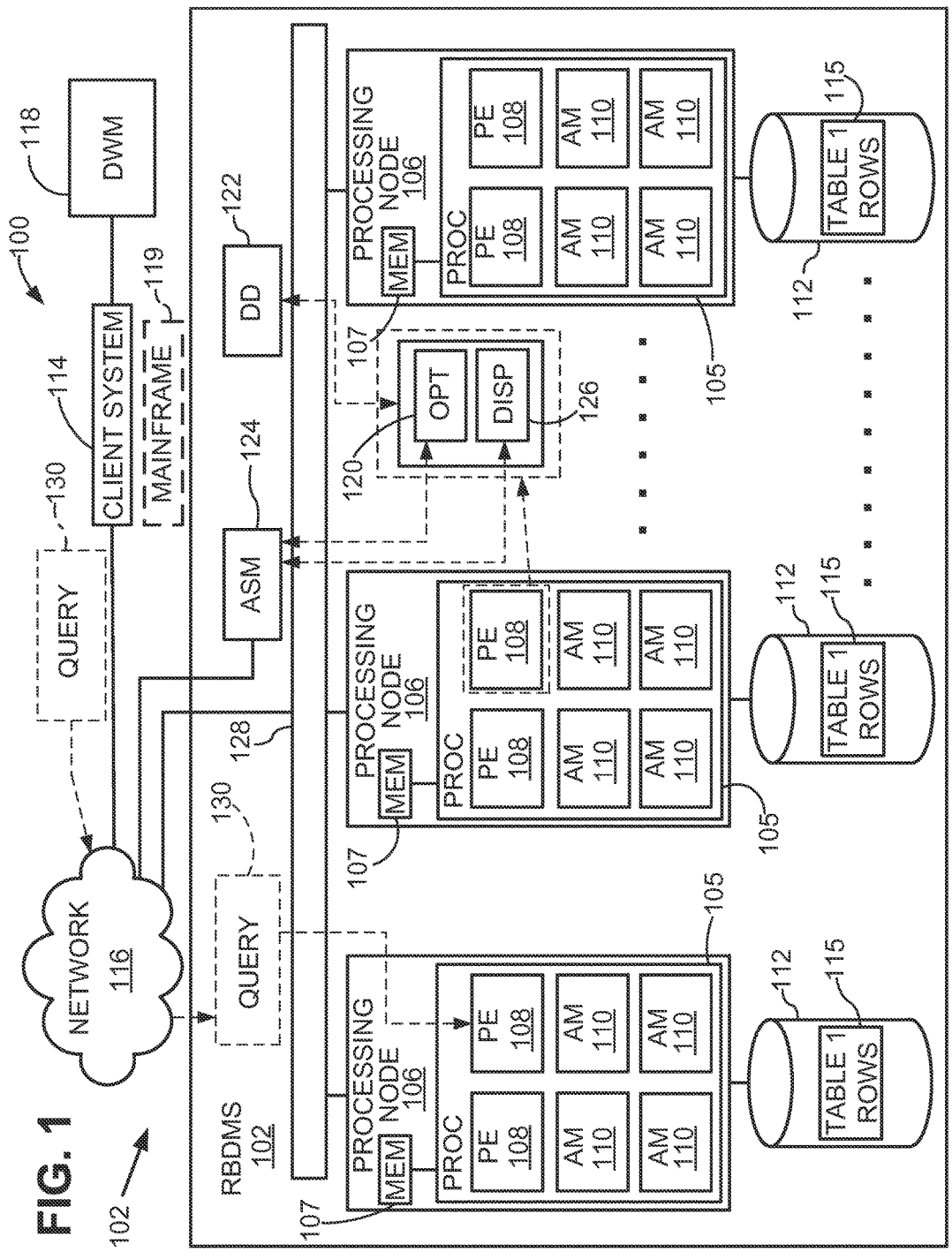
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, a module, such as the parsing engine modules 108 and access modules 110, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 107, for example, that comprises instructions executable with the processor 105 or other processor to implement one or more of the features of the module. When any one of the module includes the portion of the memory that comprises instructions executable with the processor, the module may or may not include the processor. In some examples, each module may just be the portion of the memory 107 or other physical memory that comprises instructions executable with the processor 105 or other processor to implement the features of the corresponding module without the module including any other hardware. Because each module includes at least some hardware even when the included hardware comprises software, each module may be interchangeably referred to as a hardware module, such as the parsing engine hardware module or the access hardware module. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 105 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RDBMS 102 may include a workload management (WM) module 124, which in one example may be Teradata Active System Management. The WM module 124 may be implemented as a "closed-loop" system management (CLSM) architecture capable of satisfying a set of workload-specific goals. In other words, the RDBMS 102 is a goaloriented workload management system capable of supporting complex workloads and capable of self-adjusting to various types of workloads. The WM module 124 may communicate with each optimizer module 120, as shown in FIG. 1, and is adapted to convey a confidence threshold parameter and associated parameters to the optimizer module 120 in communication. Further, the WM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the WM module 124 via the network 116.

The WM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the WM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
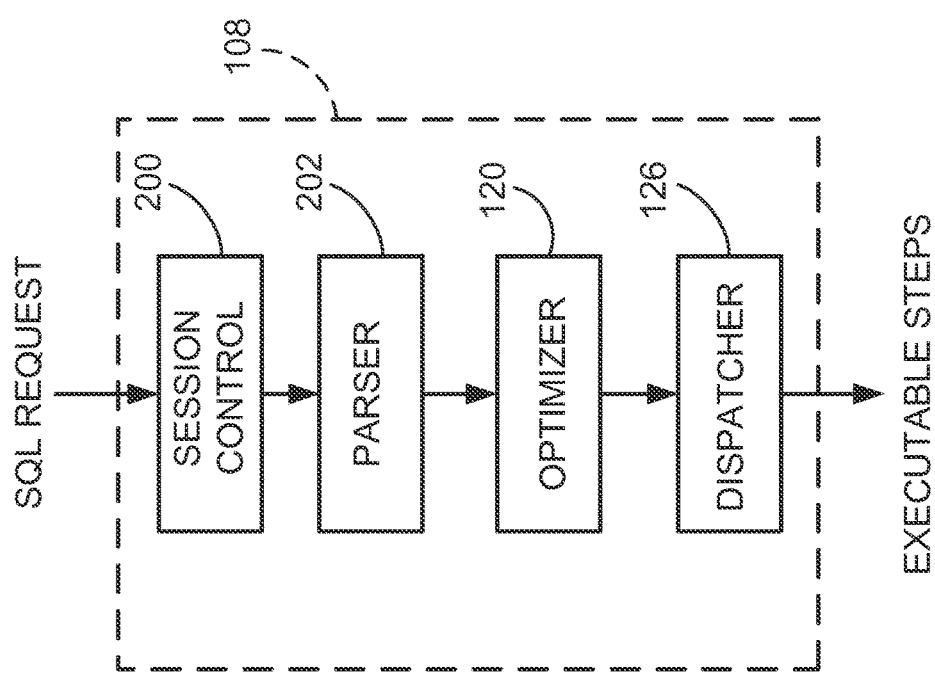
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
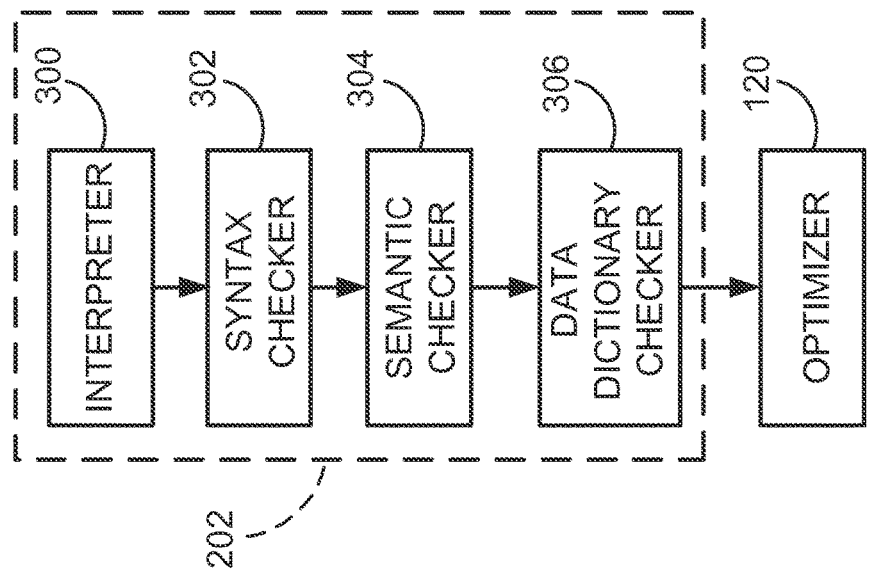
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the WM 124 is configured to monitor runtime exception criteria. The WM 124 monitoring takes place by communicating with the dispatcher module 126 as it checks the query execution step responses from the access modules 110. The step responses include the actual cost information, which the dispatcher module 126 may then communicate to the WM 124 which, in turn, compares the actual cost information with the estimated costs of the optimizer module 120.

During operation, various statistics may be gathered on database tables. These statistics are used to determine query response plans to a received query. The statistics may be based on full database scans. FIG. 4 is an example operational flow diagram of the RDBMS 102 indicating a manner in which the statistics are gathered and implemented. The RDBMS 102 may generate statistics on one or more data tables at a predetermined time (400), which may be regularly scheduled or triggered by some event. The generated statistics may be stored in the RDBMS 102 (402), such as in the DSFs 112 or other storage devices. The RDBMS 102 may receive a query, such as the query 130, involving one or more of the database tables on which the statistics are generated (404). Upon receipt of the query, the RDBMS 102 may retrieve the statistics associated with the database tables of the query (406). The RDBMS 102 may determine query response costs based on the retrieved statistics (408). A query response plan may be selected by the optimizer module 120 based on the query response costs (410) and executed (412) by the RDBMS 102. The results may be transmitted to a user interface (414), such as that included in the client system 114.

In one example, several different statistics may be gathered on the various database tables. Table 1 provides a set of these statistics:

TABLE 1

| Notations for Types of Statistics | For Single-column statistics | For Multi-column statistics |
|---|---|---|
| NAnyNull | The number of NULL values. | The number of sets of values in which a NULL value exists. |
| NAllNull | The number of NULL values. | The number of sets of values in which only NULL values exist. |

TABLE 1-continued

| Notations for Types of Statistics | For Single-column statistics | For Multi-column statistics |
| --- | --- | --- |
| NUV | The number of unique values. | The number of unique value sets, among no-null value sets and all-null value sets |
| HMF | The frequency of the value which is the most frequent. | The frequency of the set which is the most frequent, among no-null value sets and all-null value sets |
| NUVAN | N/E (Not Exist) | The number of unique value sets, among any-null value sets |
| HMFAN | N/E (Not Exist) | The frequency of the set which is the most frequent, among any-null value sets |

Due to the resource-intensive nature of full database scans, the statistics are not updated each time a database table is changed. Thus, in many instances the statistics may serve as estimates and not exact values regarding the database tables. Furthermore, these statistics may be manually manipulated for a specific purpose. Due to these estimations and manipulations, the integrity of the statistics may be compromised such that the statistics violate fundamental principles.

Each statistic may be associated with an individual statistical integrity that, when compromised, renders the statistic less valuable, if not totally ineffective, for query response planning. As an example of individual statistical integrity, the value of NUV for a database table can never exceed the row count (RC), since the maximum value of NUV is the number of rows of a table. Thus, in order to ensure that the integrity of the NUV value is maintained, the NUV value cannot exceed RC. While all of the statistics listed in Table 1 can be analyzed for individual integrity, these statistics are interrelated with one another through various relationships and, if not properly selected, may compromise the integrity of the relationships, which devalue the statistics if violated. In one example, the RDBMS 102 may implement a rules set to check the integrity of these relationships. In one example, the rules set may include:

$NUV-1<=RC-(NAnyNull-NAllNull)$   Rule 1:

$NUV+HMF-1<=RC-(NAnyNull-NAllNull)$   Rule 2:

$NUV*HMF>=RC-(NAnyNull-NAllNull)$   Rule 3:

$NUV+NUVAN<=RC$   Rule 4:

$NUVAN<=(NAnyNull-NAllNull)$   Rule 5:

$NUVAN+HMFPN-1<=(NAnyNull-NAllNull)$   Rule 6:

In the example set of rules, the statistic RC is the one constant, since the row count is established and provides a point of reference for the other statistics. Each rule may represent a relationship between two or more statistics that, if true, indicates that the integrity of the statistics is intact with respect to one another. These rules may indicate instances of when the individual integrities may be intact, but the integrities with respect to other statistics may be compromised due to having relationships with one another. For example, for a particular database table, NUV may have a value that does not compromise individual statistical integrity, but Rule 1 may be violated if the NUV+1 is greater than RC−(NAnyNull−NAllNull). Thus, in order to eliminate the violation, one of the values of NUV, NAnyNull, or NAllNull may be adjusted.

In one example, if any of the rules are violated, the individual statistics may be adjusted with respect to the rules set in attempt to achieve validity across the entire rules set. This "normalization" of the statistics allows the integrity of the statistics to be achieved within the allowed boundaries of the statistics. Each of the statistics may be associated with a minimum and maximum value. These minimum and maximum values indicate the boundaries that, if exceeded, compromise the integrity of the individual statistics. For example, the statistic NUV has a maximum value of RC, since the most unique value possible in a column would be one per row, which is the row count. The minimum value of NUV would be one, since the lowest possible number of unique values in a non-NULL dataset is one. Thus, in normalizing the value of NUV in the rules set, the NUV value cannot be increased any higher than RC or any lower than one without violating its individual integrity.

Figure 5B:
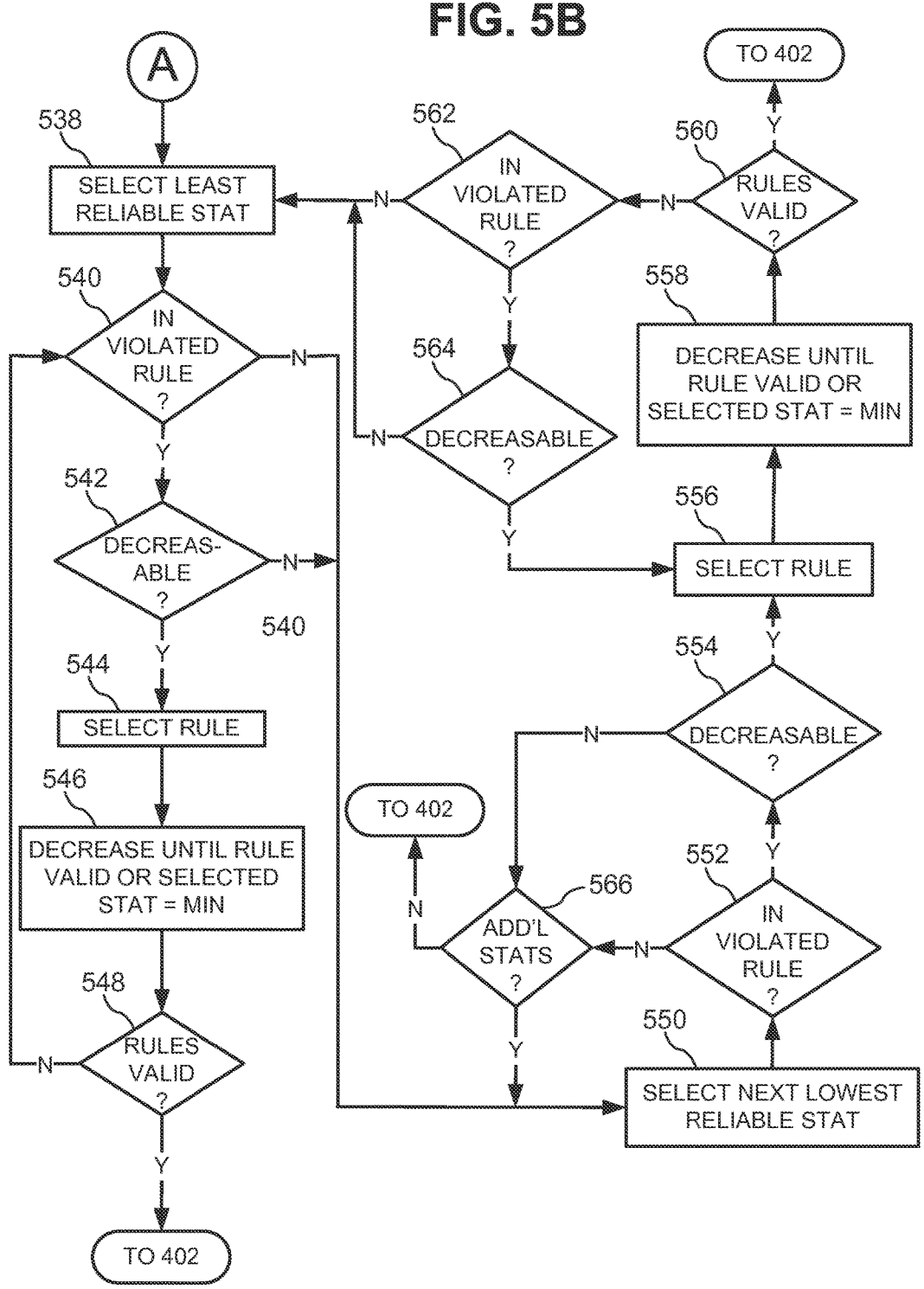

FIGS. 5A and 5B show an operational flow diagram of example operation of the RDBMS 102 during statistic normalization to establish relationship integrity across a selected group of statistics. The statistic normalization may be part of statistics generation on one or more tables at operation (400) in FIG. 4. In one example, the statistics of interest may be gathered by the RDBMS 102 (500). The statistics may be ordered based on reliability (502). In one example, the statistics may be considered for adjustment in the order of ascending reliability. This allows the more reliable statistics to be maintained if possible if adjustment of other statistics of lower-reliability eliminates any rule violations. The determination of reliability may be based on estimation methods of the individual statistics. For example, estimation of individual statistics may be based on linear trends on the change of statistics with the standard error of the linear trends converted to a reliability value. Thus, the greater the error, the smaller the reliability. Other methods of determining reliability may also be implemented.

The RDBMS 102 may perform error pruning of the statistics (504). The error pruning may include setting a statistic to its maximum or minimum depending on its current value. This may include setting a value of a statistic to the maximum of all possible minimum values. In one example, the rules set may use statistics that cannot exceed RC. In such a scenario, for any statistics having a value greater than RC, the RDBMS 102 may reduce the statistic value to RC. Conversely, for any statistic that has a negative value, the RDBMS 102 may increase the statistic value to zero.

The RDBMS 102 may use statistics to determine if the rules set is valid (506). If the rules set is valid, the statistics may be stored for subsequent use by the optimizer module 120 (402). If any of rules are violated, the RDBMS 102 may enter a normalization increase phase, in which the statistics may be increased in order to eliminate the violations of the rules of each rules set. In one example, the RDBMS 102 may select the statistic having the lowest reliability (508), referred to herein as "first statistic". The RDBMS 102 may determine if the selected first statistic is in any violated rule (510). If the selected first statistic is in the violated rule, the RDBMS 102 may determine if the selected first statistic is increasable (512). Each statistic may be associated with a maximum value, which cannot be exceeded without violating the individual integrity of the statistic, such as increasing NUV above RC. If the statistic is already at its maximum value, it cannot be increased. In addition, in some rules, increasing a particular statistic cannot eliminate the violation of the rule. For example, if Rule 4 were violated, NUV cannot be increased to eliminate the violation. Thus, determining if a statistic is increasable is based on both the value of the statistic and how its increase would affect a rule.

If the selected first statistic is increasable, the RDBMS 102 may select a violated rule containing the selected first statistic (514). If more than one rule is violated, rule selection may be based on a predetermined order or may be randomly selected by the RDBMS 102. Once the rule is selected, the RDBMS 102 may increase the value of the selected first statistic until the rule is no longer violated or until the selected statistic has reached its maximum (516). In one example, increase of statistic values may include continuously incrementing a value by one until the rule is no longer violated or the maximum value has been reached. Once the selected first statistic has been increased, the RDBMS 102 may again determine if the rules set is valid (518). If so, the adjusted statistics may be stored (402) for subsequent use by the optimizer module 120.

If the rules set is determined to still contain a violated rule, the RDBMS 102 may determine if the selected first statistic is contained in another violated rule (510). If the selected first statistic is absent from any violated rules, the RDBMS 102 may select the next statistic having the next lowest reliability (518). However, if the selected first statistic is determined to be in another violated rule (510), the RDBMS 102 may determine if the selected first statistic is increasable (512) and, if so, select a violated rule (514) and increase the value of the selected first statistic accordingly (516). This may continue until the rules are determined to be valid (518) or the selected first statistic is determined to no longer be increasable (512).

Once the statistic having the next lowest reliability (LRS) is chosen (520), the RDBMS 102 may determine if the selected statistic is in any violated rules (522). If the selected statistic is contained in a violated rule, the RDBMS 102 may determine if the selected statistic is increasable (524). If the selected statistic is increasable, the RDBMS 102 may select a violated rule containing the selected statistic (526). The RDBMS 102 may increase the selected statistic value until the selected rule is valid or the selected statistic reaches its maximum value (528). Once the increase is complete, the RDBMS 102 may determine if the rules set is valid based on the increase to the selected statistic (530). If the rules set is valid, the RDBMS 102 may store the statistics for subsequent use (402) by the optimizer module 120. If any of the rules are still violated, the RDBMS 102 may determine if the increased selected statistic is in any of the violated rules (532). If the increased selected statistic is determined to be in a violated rule, the RDBMS 102 may determine if the increased selected statistic is increasable (534), select a violated rule (526) and increase accordingly (528). Each time an increased selected statistic is increased for violated rule, the RDBMS 102 may determine if the rules set is valid (532) and proceed accordingly as described.

If an increased selected statistic is determined to be absent from any other violated rules (532) or not increasable (534), the RDBMS 102 may again select the first statistic (508). Thus, each time any statistic other than the first statistic is increased, once any increases in the selected statistic are complete, the RDBMS 102 may begin the normalization increase phase over again initially analyzing the selected first statistic to determine if it is present in any violated rules (510) and increasable (512) and, if so, increasing the selected first statistic as described. Operating in such a manner allows the RDBMS 102 to ensure that increasing a statistic does not cause the values of any other previously analyzed statistics to create a violation of any other rules.

Prior to any increase in value, if a selected statistic (other than the first statistic) is determined not to be contained in any of the violated rules (522) or is not increasable (524), the RDBMS 102 may determine if any additional statistics of higher reliabilities exist (536). If any additional statistics are determined to exist, the RDBMS 102 may select the next statistic in the order of ascending reliability (520). Once the RDBMS 102 determines no additional statistics of higher reliabilities exist (534), this determination indicates that, while at least one rule is still violated, statistic values are either at a maximum or cannot be increased to eliminate rule violations. In such a scenario, the RDBMS 102 may enter a normalization decrease phase (see FIG. 5B).

In the normalization decrease phase, the RDBMS 102 may again select the first statistic, which has the lowest relative reliability (538). The RDBMS 102 may determine if the selected first statistic is any violated rules (540). If so, the RDBMS 102 may determine if the selected first statistic is decreasable (542). Each statistic may have a minimum value that it cannot be lower than without violating the integrity. For example, the value of NUV cannot be less than one because any table column having a non-NULL data set will have an NUV value of at least one. In addition, decreasing the value of statistic may fail to have any effect on eliminating the violation of a rule. Thus, the determination of a decreasing a statistic value may be based on both the minimum value of the statistic and the effect it is has on a rule if decreased.

If the selected statistic is decreasable, a rule being violated containing the selected statistic may be selected (544). The selected statistic may be decreased until the selected rule is valid or until the selected statistic reaches its minimum value (546). In one example, decrease of statistic values may include continuously decrementing a value by one until the rule is no longer violated or the minimum value has been reached. The RDBMS 102 may then determine if the rules set is valid based on the decrease of the selected statistic (548). If the rules set is valid, the statistics may be stored (402) for subsequent use by the optimizer module 120. If at least one rule is still violated, the RDBMS 102 may determine if the selected statistic is in any other violated rules (540) and, if so, determine if the selected statistic is decreasable (542) and adjust accordingly (544).

Once the selected statistic is determined to no longer be in a violated rule or is not decreasable, the RDBMS 102 may select the statistic having the next lowest reliability (550). The RDMBS 102 may determine if a selected statistic is in a violated rule (552). If the selected statistic is in a violated rule, the RDBMS 102 may determine if the selected statistic is decreasable (554). If the selected statistic is decreasable, a violated rule may be selected (556) and the selected statistic may be decreased until the rule is no longer violated or the selected statistic reaches its minimum value (558). After the selected statistic is decreased, the RDBMS 102 may determine if the rules set is valid (560). If so, the statistics may be stored (402) for subsequent use by the optimizer module 120. If at least one rule is still violated, the RDBMS 102 may determine if the selected decreased statistic is in another violated rule (562). If the selected decreased statistic is in another violated rule, the RDBMS 102 may determine if the selected decreased statistic is decreasable (564). If so, the RDMBS 102 may select a violated rule (556) and adjust the selected statistic accordingly (558). The RDBMS 102 may continue this iterative process for the selected decreased statistic until the rules set is determined to be valid (560) or the selected decreased statistic is no longer decreasable (564).

Similar to the normalization increase phase, if a decreased selected statistic is determined to be absent from any other violated rules (562) or not decreasable (564), the RDBMS 102 may again select the first statistic (538). Thus, each time any statistic other than the first statistic is decreased, once any decreases in the decreased selected statistic are complete, the RDBMS 102 may begin the normalization decrease phase over again initially analyzing the selected first statistic to determine if it is present in any violated rules (540) and decreasable (542) and, if so, decreasing the selected first statistic as described. Operating in such a manner allows the RDBMS 102 to ensure that decreasing a statistic does not cause the value of the other statistics to create a violation of any other rules.

Prior to any decrease in value, if a selected statistic (other than the first statistic) is determined to be absent from any of the violated rules (552) or is not decreasable (554), the RDBMS 102 may determine if any additional statistics of higher reliabilities exist (566). If any additional statistics exist are determined to exist, the RDBMS 102 may select the next statistic in the order of lowest reliability (550). Once the RDBMS 102 determines no additional statistics of higher reliabilities exist (566), this determination indicates that, while at least one rule is still violated, statistic values are either at a minimum or cannot be decreased to eliminate rule violations. In such a scenario, the RDBMS 102 the statistics may be stored (402) for subsequent use by the optimizer module 120.

In other examples, when selecting statistics, the order of selection may be based on factors other than reliability. For example, the statistics may be selected in a predetermined order. The RDBMS 102 may use the predetermined order of statistics in the scenario in which reliabilities are unavailable or may be used instead of the reliabilities. The examples herein have been provided with the context of a relational database system. However, all examples are applicable to various types of data stores, such as file systems or other data stores suitable for organization and processing of data. Moreover, additional or fewer operations of the operational flow diagrams may be implemented in some examples and the orders may be changed in some examples. While various embodiments of the invention have been described, it will be apparent to those of ordinary skill in the art that many more examples and implementations are possible within the scope of the invention. Accordingly, the invention is not to be restricted except in light of the attached claims and their equivalents.

I claim:

1. A data store system comprising:
   an array of persistent storage devices configured to store a plurality of data store tables and a set of rules associated with a plurality of statistical categories, wherein each rule comprises a relationship between values of at least two statistical categories, wherein each statistical category defines a respective characteristic about the overall content of one or more columns of a data store table;
   a processor in communication with the storage device, the processor configured to:
   generate a statistical value for each statistical category on a data store table from the plurality of data store tables;
   retrieve the set of rules;
   evaluate the set of rules based on the statistical values;
   in response to the determination that at least one rule of the set of rules is violated, adjust at least one statistical value;
   store statistical values in at least one of the persistent storage devices;
   receive a query on the data store table; and
   use at least one of the statistical values to generate a response to the query.

2. The data store of claim 1, wherein the processor is further configured to:
   in response to each adjustment of a statistical value:
   determine if any of the rules of the set of rules is violated;
   evaluate the set of rules; and
   in response to a determination that no rules of the set of rules is violated, store the statistical values in at least one of the persistent storage devices.

3. The data store system of claim 1, wherein the processor is further configured to:
   determine a reliability value for each statistical value; and
   in response to the determination that at least one rule of the set of rules is violated:
   select each statistical value separately in an order of ascending reliability value;
   determine if a selected statistical value is present in the at least one rule; and
   in response to a selected statistical value being present in the at least one rule, adjust the selected statistical value.

4. The data store of claim 3, wherein the processor is further configured to, in response to a selected statistical value being associated with the at least one rule, increase the selected statistical value.

5. The data store of claim 4, wherein the processor is further configured to, in response to a selected statistical value being associated with the at least one rule, increase the selected statistical value until the at least one rule is no longer violated or the selected statistical value reaches a maximum value.

6. The data store of claim 3, wherein the processor is further configured to, in response to a selected statistical value being associated with the at least one rule, decrease the selected statistical value.

7. The data store of claim 6, wherein the processor is further configured to, in response to a selected statistical value being associated with the at least one rule, decrease the selected statistical value until the at least one rule is no longer violated or the selected statistical value reaches a minimum value.

8. A computer-implemented method comprising:
   generating a plurality of statistical values on a data store table from a plurality of data store tables stored in an array of persistent storage devices, wherein each statistical value is associated with a statistical category, and wherein each statistical category defines a respective characteristic about the overall content of one or more columns of a data store table;
   retrieving a set of rules associated with the statistical categories, wherein each rule comprises a relationship between values of at least two statistical categories;
   evaluating the set of rules based on the plurality of statistical values;
   in response to the determination that at least one rule of the set of rules is violated, adjusting a value of at least one of the plurality of statistical values;
   storing the plurality of statistical values in at least one of the persistent storage devices;
   receiving a query on the data store table; and
   using at least of one the stored plurality of statistical values to generate a response to the query.

9. The computer-implemented method of claim 8, further comprising:

in response to each adjustment of a statistical values:
determining if any of the rules of the set of rules is violated;
evaluating the set of rules; and
in response to a determination that no rules of the set of rules is violated, storing the plurality of statistical values in at least one of the persistent storage devices.

10. The computer-implemented method of claim 8 further comprising:
determining a reliability value for each statistical values; and
in response to the determination that at least one rule of the set of rules is violated:
selecting each statistical value separately in an order of ascending reliability value;
determining if a selected statistical value is present in the at least one rule; and
in response to a selected statistical value being present in the at least one rule, adjusting the selected statistical value.

11. The computer-implemented method of claim 10, wherein adjusting the selected statistical value comprises, in response to a selected statistical value being present in the at least one rule, increasing the selected statistical value.

12. The computer-implemented method of claim 11, wherein increasing the selected statistical value comprises, in response to a selected statistical value being present in the at least one rule, increasing the selected statistical value until the at least one rule is no longer violated or the selected statistical value reaches a maximum value.

13. The computer-implemented method of claim 10, wherein adjusting the selected statistical value comprises, in response to a selected statistical value being present in the at least one rule, decreasing the selected statistical value.

14. The computer-implemented method of claim 13, wherein decreasing the selected statistical values comprises in response to a selected statistical value being present in the at least one rule, decreasing the selected statistical value until the at least one rule is no longer violated or the selected statistical value reaches a minimum value.

15. A non-transitory computer-readable medium encoded with a plurality of instructions executable by a process, the plurality of instructions comprising:
instructions to generate a plurality of statistical values on a data store table from a plurality of data store tables stored in an array of persistent storage devices, wherein each statistical value is associated with a statistical category, and wherein each statistical category defines a respective characteristic about the overall content of a column one or more columns of a data store table;
instructions to retrieve a set of rules associated with the statistical categories, wherein each rule comprises a relationship between values of at least two statistical categories;
instructions to evaluate the set of rules based on the plurality of statistical values;
in response to the determination that at least one rule of the set of rules is violated, instructions to adjust a value of at least one of the statistical values;
instructions to store of the plurality of statistical values in at least one of the persistent storage devices;
instructions to receive a query on the data store table; and
instructions to use at least one of the stored plurality of statistical values to generate a response to the query.

16. The non-transitory computer-readable medium of claim 15, wherein the plurality of instructions further comprises:
in response to each adjustment of a selected statistical values:
instructions to determine if any of the rules of the set of rules is violated;
instructions to evaluate the set of rules, and
in response to a determination that no rules of the set of rules is violated, instructions to store the plurality of statistical values in at least one of the persistent storage devices.

17. The non-transitory computer-readable medium of claim 15, wherein the plurality of instructions further comprises:
instructions to determine a reliability value for each statistical values; and
in response to the determination that at least one rule of the set of rules is violated:
instructions to select each statistical value separately in an order of ascending reliability value;
instructions to determine if a selected statistical value is present in the at least one rule; and
in response to a selected statistical value being present in the at least one rule, instructions to adjust the selected statistic.

18. The non-transitory computer-readable medium of claim 17, wherein the plurality of instructions further comprises, in response to a selected statistical value being present in the at least one rule, instructions to increase the selected statistical value.

19. The non-transitory computer-readable medium of claim 18, wherein the plurality of instructions further comprises, in response to a selected statistical value being present in the at least one rule, instructions to increase the selected statistical value until the at least one rule is no longer violated or the selected statistical value reaches a maximum value.

20. The non-transitory computer-readable medium of claim 17, wherein the plurality of instructions further comprises, in response to a selected statistical value being present in the at least one rule, instructions to decrease the selected statistical value.

* * * * *